US011669257B2

(12) United States Patent
Palanisamy et al.

(10) Patent No.: US 11,669,257 B2
(45) Date of Patent: Jun. 6, 2023

(54) CONTAINER MANAGEMENT IN A STORAGE SYSTEM

(71) Applicant: Hewlett Packard Enterprise Development LP, Houston, TX (US)

(72) Inventors: Nandesh Kumar Palanisamy, Andover, MA (US); Alastair Slater, Chepstow (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/450,359

(22) Filed: Oct. 8, 2021

(65) Prior Publication Data

US 2023/0111795 A1   Apr. 13, 2023

(51) Int. Cl.
*G06F 3/06* (2006.01)
(52) U.S. Cl.
CPC .......... *G06F 3/0638* (2013.01); *G06F 3/0604* (2013.01); *G06F 3/0679* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 7,644,408 B2 * 1/2010 Kroening .............. G06F 9/5072
709/201
7,962,528 B1 * 6/2011 Pasupathy ............... G06F 16/13
711/111

(Continued)

FOREIGN PATENT DOCUMENTS

EP        3037964 B1    7/2018

OTHER PUBLICATIONS

M. Zhang, D. Marino and P. Efstathopoulos, "Harbormaster: Policy Enforcement for Containers," 2015 IEEE 7th International Conference on Cloud Computing Technology and Science (CloudCom), Vancouver, BC, Canada, 2015, pp. 355-362, doi: 10.1109/CloudCom. 2015.96. (Year: 2015).*

(Continued)

*Primary Examiner* — Daniel C. Chappell
(74) *Attorney, Agent, or Firm* — Trop, Pruner & Hu, P.C.

(57) ABSTRACT

Examples described herein relate to management of containers in a storage system. Examples may receive a container specification corresponding to a container image. Examples may obtain the container image from a container repository and select storage volumes based on the container specification. Examples may execute one or more containers from the container image on a controller of the storage system within resource limits. Examples may dynamically select the controllers based on resource availability at the plurality of controllers. Examples may allow scheduling the execution of the containers at a specific controller at a predetermined time. The execution may include performing one or more batch operations on the storage volumes. Examples may further enable monitoring a status of the container and providing alerts in response to a detection of a failure event associated with the container.

17 Claims, 7 Drawing Sheets

(58) Field of Classification Search
CPC ... G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 8,135,930 | B1* | 3/2012 | Mattox | G06F 3/0617 |
| | | | | 711/100 |
| 8,255,915 | B1 | 8/2012 | Blanding et al. | |
| 8,429,368 | B2* | 4/2013 | Eisler | G06F 11/2094 |
| | | | | 711/170 |
| 8,667,246 | B2* | 3/2014 | Rope | G06F 3/0623 |
| | | | | 709/216 |
| 8,745,338 | B1* | 6/2014 | Yadav | G06F 3/067 |
| | | | | 707/693 |
| 8,769,224 | B1* | 7/2014 | Raj | G06F 11/1464 |
| | | | | 711/E12.103 |
| 8,843,711 | B1* | 9/2014 | Yadav | G06F 3/064 |
| | | | | 711/201 |
| 8,849,966 | B2* | 9/2014 | Murase | G06F 9/45558 |
| | | | | 718/1 |
| 9,164,864 | B1 | 10/2015 | Novick et al. | |
| 10,020,996 | B1* | 7/2018 | Protasov | H04L 41/40 |
| 10,719,253 | B2 | 7/2020 | Alkalay et al. | |
| 10,922,205 | B2 | 2/2021 | Asawa et al. | |
| 2012/0005673 | A1* | 1/2012 | Cervantes | G06F 9/45558 |
| | | | | 718/1 |
| 2013/0159637 | A1* | 6/2013 | Forgette | G06F 3/067 |
| | | | | 711/E12.001 |
| 2016/0255016 | A1 | 9/2016 | Miller | |
| 2018/0018116 | A1 | 1/2018 | Hallisey | |
| 2018/0164791 | A1 | 6/2018 | Debes et al. | |
| 2019/0146718 | A1* | 5/2019 | Ben Dayan | G06F 3/061 |
| | | | | 711/154 |
| 2019/0245766 | A1* | 8/2019 | Onoue | H04L 67/10 |
| 2020/0034043 | A1 | 1/2020 | Szczepanik et al. | |
| 2021/0311759 | A1* | 10/2021 | Corrie | G06F 9/45558 |

OTHER PUBLICATIONS

C. Makaya, D. Freimuth, D. Wood and S. Calo, "Policy-based NFV management and orchestration," 2015 IEEE Conference on Network Function Virtualization and Software Defined Network (NFV-SDN), San Francisco, CA, USA, 2015, pp. 128-134, doi: 10.1109/NFV-SDN.2015.7387417. (Year: 2015).*
T. Ritter, R. Schreiner and U. Lang, "Integrating Security Policies via Container Portable Interceptors," in IEEE Distributed Systems Online, vol. 7, No. 7, pp. 1-1, Jul. 2006, doi: 10.1109/MDSO.2006. 44. (Year: 2006).*
T. Lu, F. Zeng, J. Shen, G. Chen, W. Shu and W. Zhang, "A Scheduling Scheme in a Container-Based Edge Computing Environment Using Deep Reinforcement Learning Approach," 2021 17th International Conference on Mobility, Sensing and Networking (MSN), Exeter, United Kingdom, 2021, pp. 56-65 (Year: 2021).*
Martin et al., "Storage Intelligence in SSDs and Standards,", Storage Developer Conference, 2015, 17 pages.
Flashdba, "All Flash Arrays: Active/Active versus Active/Passive", available online at <https://flashdba.com/2016/10/19/all-flash-arrays-activeactive-versus-activepassive/>, Oct. 19, 2016, 7 pages.
Gaysee, Jerome, "A Comparison of In-Storage Processing Architectures and Technologies", SDC, Sep. 24-27, 2018, 50 pages.
HPE, "HPE Nimble Storage Deployment Considerations for Standalone Servers and Failover Clusters on Windows Server 2016", 2018, 27 pages.
HPE, "HPE RMC 6.0: Storage-Integrated Data Protection and Copy Data Management at the Speed of all-Flash", available online at <https://community.hpe.com/t5/Around-the-Storage-Block/HPE-RMC-6-0-Storage-integrated-data-protection-and-copy-data/ba-p/7020216>, Oct. 2, 2018, 11 pages.
Hwang, J-H. et al., "High-availability Algorithms for Distributed Stream Processing," (Research Paper), 21st International Conference on Data Engineering (ICDE'OS), Apr. 18, 2005, 12 pages.
Klaus, Jon, "Nimble Storage—InfoSight VMVision", Fast Storage, HPE, available online at <https://faststorage.eu/nimble-storage-infosight-vmvision/>, Feb. 22, 2016, 2 pages.
Kukreti, V. et al., "High Availability and Automatic Failover in Hadoop," (Web Page), retrieved on line Feb. 28, 2019, https://www.3pillarglobal.com/insights/high-availability-and-automatic-failover-in-hadoop.
NGD Systems,Inc, "NGD Systems Computational Storage Devices Now Support Containers for Flexible Application Deployment", available online at <https://www.ngdsystems.com/page/NGD-Systems-Computational-Storage-Devices-Now-Support-Containers-for-Flexible-Application-Deployment>, May 23, 2012, 3 pages.
Red Hat Inc., "Chapter 7: Failover Services (FOS)," (Web Page), retrieved online Feb. 21, 2019, https://docs.huihoo.com/redhat/haserver/RHHAS-1.0-Manual/ch-fos.html.
Sanity Solution Inc., "Active/Active Clustering 101", available online at <https://www.sanitysolutions.com/active-clustering-101/>, Jul. 24, 2017, 8 pages.
Scott Shadley, "Deployment of In-Storage Compute," Sep. 2018, 2018 Storage Developer Conference, <https://www.snia.org/sites/default/files/SDC/2018/presentations/NVMe/Shadley_Scott_Deployment_of_In-Storage_Compute.pdf>.
Scott Shadley, "SDC 2018—Deployment of In-Storage Compute with NVMe Storage at Scale and Capacity," Oct. 24, 2018, Published by SNIAVideo, (video transcription), <htips://www.youlube.com/watch?v=8Q2B0DLeHL0>.
Snia, "Computational Storage Architecture and Programming Model", Version 0.5 Revision 1, Aug. 6, 2020, pp. 1-66.
Vaughn Stewart, "Pure Storage 101: Ensuring 100% Performance," Apr. 2, 2014, <https://blog.purestorage.com/pure-storage-101-ensuring-1 DO-performance/>.
Virtuozzo, "Installing Parallels Containers for Windows on Cluster Nodes," (Web Page), retrieved online Feb. 28, 2019, http://download.swsoft.com/pvc/60/win/docs/en/Parallels%20Containers%20for%20Windows%20Clustering%20Guide/28467.htm.

* cited by examiner

CONTAINER MANAGEMENT IN A STORAGE SYSTEM

BACKGROUND

A client computing system, such as a host server or the like, may execute host applications and store data used by the host applications in a separate computing system, such as a storage array. The storage array may include a plurality of controllers (e.g., storage controllers, array controllers, or the like) that facilitate a connection between the client computing system and the data stored in the storage array. In some examples, the plurality of controllers may include computing resources, such as processing resources, memory resources, and the like, to perform input/output (IO) operations (e.g., read/write operations) on the data.

BRIEF DESCRIPTION OF THE DRAWINGS

The following detailed description references the drawings, wherein.

DETAILED DESCRIPTION

Figure 1:
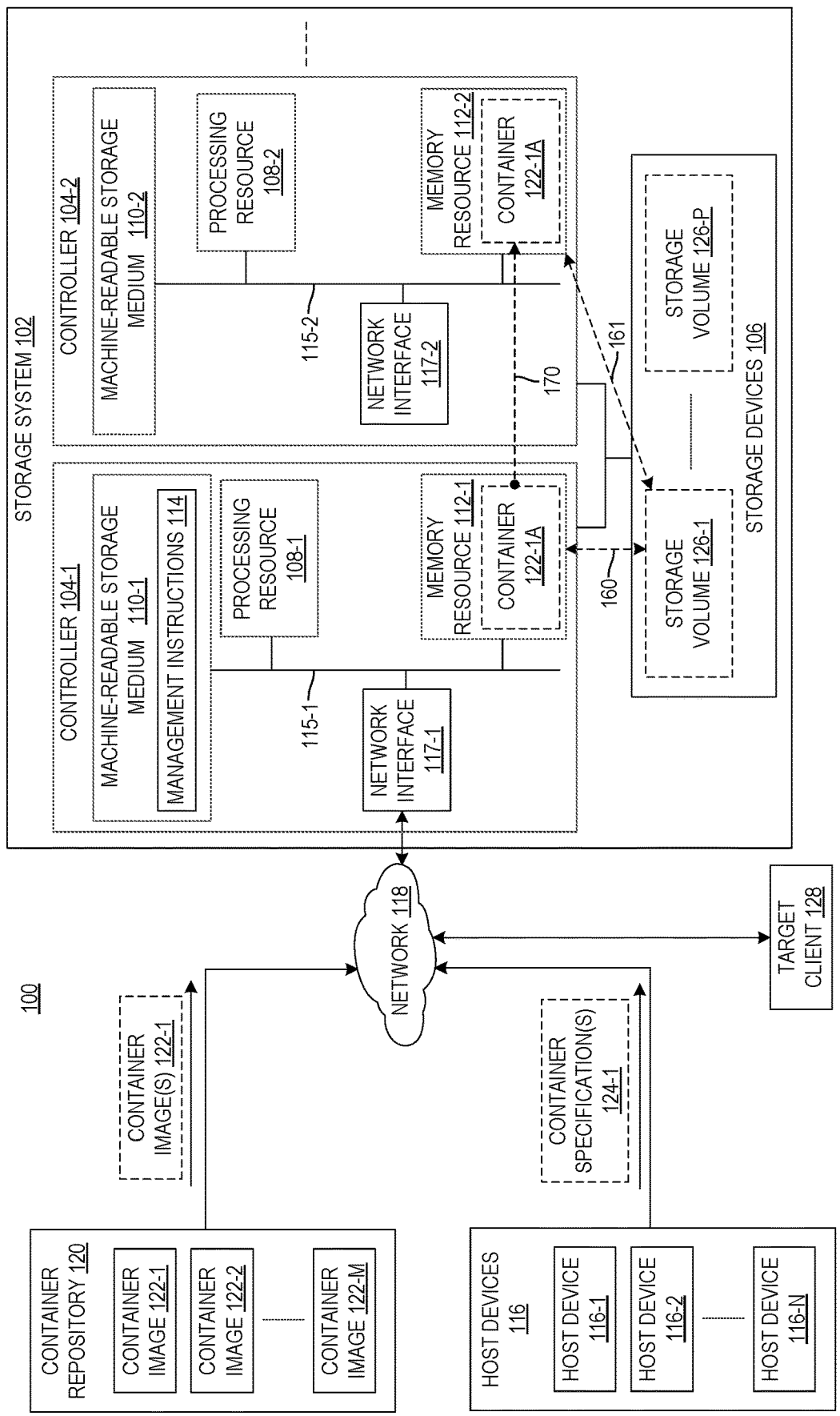
FIG. 1 is a block diagram of a storage system that performs management of containers, in accordance with an example.

A computing system (such as a storage array) and a client computing device (such as a server (e.g., in a datacenter) or an edge computing device (e.g., Internet of Things device)) may be separate devices communicating via a computer network to perform dedicated functions. For example, the client computing device (referred to herein as a host device) may perform computation functions (e.g., executing host applications) using computing resources (such as processing and memory resources) and the storage array may perform storage functions (e.g., storing data) using a plurality of storage devices. The host applications executing on the host device may send requests, such as input/output (IO) requests (e.g., read/write requests), deduplication requests, snapshot requests, or the like, to the storage array. The storage array may process the requests received from the host device and perform operations corresponding to the requests (e.g., read/write operations, deduplication operations, snapshot operations) on the data stored in the plurality of storage devices.

The host device and the storage array may communicate via at least one computer network (e.g., network-attached storage (NAS), a storage area network (SAN), or a direct-attached storage (DAS)). In some networks (such as NAS and SAN), a host device and storage array may communicate via networking components (e.g., switch, router, etc.), while in DAS, a host device is directly attached to a storage array via a cable (e.g., a host bus adapter). Some networks like SANs may be more scalable when compared to other networks like DAS networks. For example, in SANs, a single storage array may process IO requests received from a plurality of host devices simultaneously, while in DAS, the storage array may process 10 requests received from a single host device that is coupled to the storage array.

However, in SANs, the performance of host applications may be affected due to delayed communication between host device(s) and storage array(s). The delayed communication may be due to the host device(s) and storage array(s) being geographically distant from each other, for example. In such examples, a request (e.g., IO request) from a host application and a response to such a request may travel through several networks (i.e., several hops) between a host device and a storage array. Such a host application may send a large number of IO requests to a storage array during its execution. The response to such requests may sometimes include large volumes of data that may consume high bandwidth and take a relatively long time for completion. Therefore, the overhead experienced by each IO request and its completion may affect the performance of the host applications.

Some examples may address the challenges noted above by executing a host application locally at a storage array. For example, one or more controller(s) of a storage array may include computing resources, such as processing and memory resources, that may be idle from time to time. The storage array may be capable of executing the host application, in whole or in part, using such computing resources available at the one or more controller(s). For example, the available computing resources may be useable to run a container in which to run a containerized version of all or a part of the host application, which containerized version may be referred to herein as a containerized application. In examples described herein, container technology is a computing virtualization paradigm where an application is packaged, together with dependencies and libraries, in a container to provide an isolated environment for running the application. Many containers can run on top of a single operating system, but each container is inherently isolated from other containers. However, the computing resources of the one or more controller(s) of the storage array may be limited. For example, a storage array may use most of the computing resources at a controller for processing a large number of IO requests received from various host devices. It may not be feasible to execute containers and process such a large number of IO requests at the same controller simultaneously.

To address these issues, examples described herein allow management of containers in a storage system. Some examples may execute one or more container(s) on a controller of a storage system within resource limits. Some examples may dynamically select a controller, from a plurality of controllers of a storage system, to run a container, based on resource availability at each of the controllers. For instance, if the resource availability is less than a resource limit, then examples may select a different controller to execute a container. In this manner, the storage system may execute containers at a controller of the storage system without exceeding the resource limits at the controller.

Examples described herein may further enable scheduling the execution of containers at a specific controller at a predetermined time. In some examples, the execution of the containers may include performing one or more batch operations on storage volumes of the storage system. Examples described herein may further enable monitoring a status of a container and providing alerts in response to a detection of a failure event associated with the container. In this manner, the storage array may manage the lifecycles of containers within a storage system. Further, examples described herein may reduce network traffic, bandwidth consumption, and associated costs by performing operations (such as deduplication or snapshot operations) at the storage system and provide associated results to target client devices.

FIG. 1 is a block diagram of a networked system 100 that facilitates management of containers in a storage system 102, in accordance with examples described herein. The storage system 102 may be implemented by a computing system (such as a storage array, a server, a backup appliance, a hyperconverged system that combines storage, computing, and networking functions through virtualization, or the like) including a plurality of controllers 104-1, 104-2, etc., and storage devices 106. Although, for illustrative purposes, FIG. 1 shows a limited number of controllers 104-1, 104-2, storage devices 106, the storage system 102 may include any suitable number of controllers and any suitable number of storage devices.

Each controller 104-1, 104-2 may include a respective processing resource 108-1, 108-2, a respective machine-readable storage medium 110-1, 110-2 storing (e.g., encoded with) instructions, and a respective memory resource 112-1, 112-2. The components of the controllers 104-1, 104-2 may communicate over one or more busses 115-1, 115-2, respectively. Each of the controllers 104-1, 104-2 may physically access the storage devices 106 (e.g., through cables, or other communication channel(s)). The storage devices 106 may include non-volatile storage devices, such as a hard disk drive (HDD), a solid-state drive (SSD) (such as a flash drive), or any other suitable device to store data in a non-volatile manner. In some examples, the storage devices 106 may include any combination of one or more of any such non-volatile storage devices. In some examples, the storage system 102 may store data on the storage devices 106 in the form of storage volumes (labeled as 126-1 through 126-P, where "P" is an integer greater than 1). The storage volumes 126-1 to 126-P may be a collection of "virtual volumes" or Logical Unit Numbers ("LUNs") or the like. Each storage volume among the storage volumes 126-1 to 126-P may include a virtual address space backed by the storage devices 106 such that, when data is stored to the volume, the data may be stored to the storage devices 106 (e.g., when flushed from cache, etc.).

In examples described herein, the memory resources 112-1, 112-2 may be implemented by random-access memory (RAM), dynamic random-access memory (DRAM), or the like, or a combination thereof. Each of the memory resources 112-1, 112-2 may be implemented by one or more physical memory devices (e.g., DRAM devices, dual-inline memory modules (DIMMs), or the like). In some examples herein, the memory resources 112-1, 112-2 may be implemented by any suitable type of volatile or non-volatile memory that uses load/store semantics.

In examples described herein, each of the controllers may include a network interface, which may be any suitable hardware device for communicating on a computer network, such as a storage area network (SAN). In the example of FIG. 1, network interfaces 117-1, 117-2 may be respective network interface cards (NICs), FC host-bus adapters (HBAs), or the like, to communicate over one or more network(s). In the example of FIG. 1, the network interfaces 117-1, 117-2 may communicate over a network 118, which may include, for example, a SAN, a local area network (LAN), a virtual LAN (VLAN), a wireless local area network (WLAN), a virtual private network (VPN), the Internet, an internal application-specific integrated circuit (ASIC) and/or a software transport, or the like, or a combination thereof.

The controllers 104-1, 104-2 may receive requests from external devices and perform various functions and operations on storage volumes in the system 102 in response to such requests. In the example of FIG. 1, the external devices may be a plurality of host devices 116 (labeled as host devices 116-1 through 116-N, where "N" is an integer greater than 2) coupled to the storage system 102 over the network 118. In some examples, the host device(s) 116-1 to 116-N may be coupled to the storage system 102 via the network interfaces 117-1, 117-2, which may include multiple host ports (not shown in FIG. 1). Each of the host devices 116-1 to 116-N may connect with a host port, from among the host ports, thereby associating each of the host ports with a particular host device.

In some examples, the host devices 116 may be server(s) providing services to clients (e.g., a target client 128 in FIG. 1) based on the data stored at the storage devices 106. In other examples, the host devices 116 may include an end-user device or an edge-computing device (such as an IoT device). In the example of FIG. 1, a host device 116-1 may execute one or more host applications, which send IO requests to the storage system 102, which may, in response, perform operations related to the data stored in the storage devices 106 (e.g., read data from or write data to the storage devices 106). The container repository 120 may maintain a plurality of container images 122-1 to 122-M (labeled as container images 122-1 through 122-M, where "M" is an integer greater than or equal to 2). In examples described herein, a container image may be information (e.g., a static or binary file) executable (e.g., on a container runtime) to run a container. When a container image is executed (e.g., on a container runtime), it becomes a container. In some examples, container images may be stored in container repository 120 after it has been validated or authenticated (e.g., using a license key) as part of a separate process. In examples described herein, each of the container images 122-1 to 122-M may include information (e.g., instructions) to run all or a portion of a host application in a container when the container image is executed by the processing resources. In some examples, the container images 122-1 to 122-M may include machine-executable instructions, programs, libraries, frameworks, etc., associated with a respective host application (or portion thereof). In some examples, the container images 122-1 to 122-M may be a containerized application, a pod of containerized applications, a virtual machine, or the like.

In some examples, one or more controller(s) of the storage system 102 may be configured as a management controller that may manage containers in the storage system 102. In the example of FIG. 1, the controller 104-1 may be configured as a management controller. The controller 104-1 may include a machine-readable storage medium 110-1 storing at least management instructions 114 that are executable by the processing resource 108-1 to manage execution of containers on the controller 104-1 or another controller (e.g., controller 104-2) in the storage system 102 (as described in relation to FIG. 2). In the example of FIG. 1, the controller 104-2 may not be configured as a management controller as the machine-readable storage medium 110-2 of the controller 104-2 may not store the management instructions 114. The controller 104-2 may not be enabled to manage containers. In some examples, one or more of the controller(s) in the storage system may be configured as management controllers for managing containers.

Figure 2:
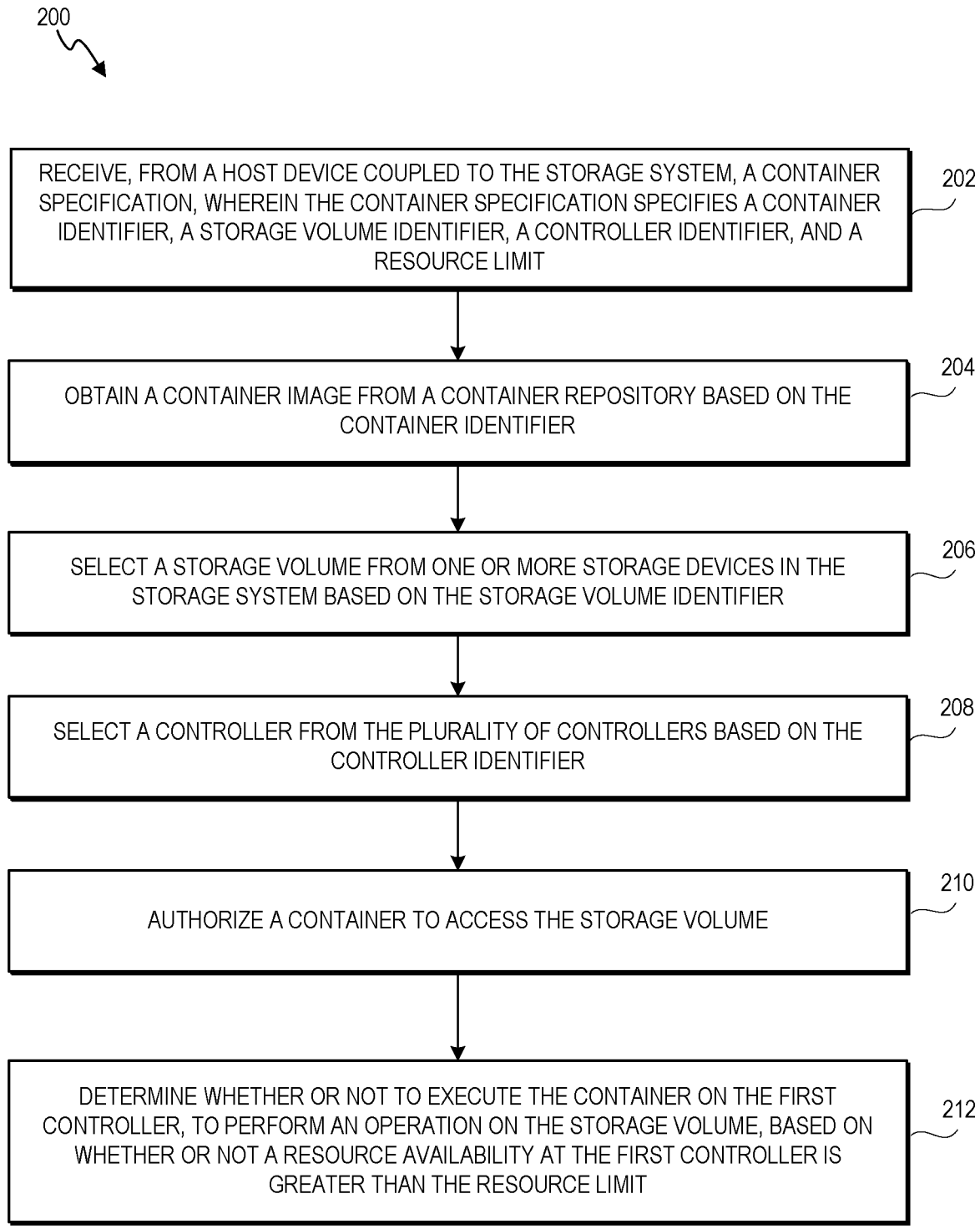
FIG. 2 is a flowchart of a method to manage containers in a storage system, in accordance with an example.

Examples are described below in relation to FIGS. 1 and 2. FIG. 2 is a flowchart of an example method 200 to manage containers in the storage system 102, where the method includes executing a container in the storage system 102 within resource limits. Although, the execution of method 200 is described below with reference to storage system 102 of FIG. 1, other systems suitable for the execution of these methods may be utilized (e.g., storage system 302 of FIG. 3, storage system 502 of FIG. 5, or the like). Additionally, implementation of this method is not limited to such examples. Although the flowchart of FIG. 2 shows a specific order of performance of certain functionalities, the method is not limited to that order. For example, the functionalities shown in succession in the flowchart may be performed in a different order, may be executed concurrently or with partial concurrence, or a combination thereof.

Referring to the examples of FIGS. 1 and 2, the storage system 102 may manage containers executed from container images 122-1 to 122-M. The processing resource 108-1 of the controller 104-1 may execute the management instructions 114 stored in the machine-readable medium 110-1 to perform the method 200. At 202 of method 200, the controller 104-1 may receive a container specification 124-1 associated with a container image 122-1 from a host application executing on the host device 116-1. For example, the host application may send a request to perform on-demand operations on the storage volumes 126-1 to 126-P or for scheduling such operations at a later time. The request may include the container specification 124-1, which may be in the form of a configuration file (e.g., an extensible markup language (XML) file, a pod manifest file, a JavaScript Object Notation (JSON) file, a YAML file, or the like) including configuration instructions for executing one or more container(s) and for performing the operations on storage volumes. Examples of the operations may include a deduplication operation, a snapshot operation, a compression operation, data-replication operation, or any other operation performed on one or more storage volume(s) in a storage system.

In some examples, the container specification 124-1 may specify a container identifier, a storage volume identifier, a controller identifier, and a resource limit. The container identifier may be a unique identifier, such as a Universal Unique Identifier (UUID), that uniquely identifies a container image. In some examples, the container identifier may include a license key associated with the container image for downloading valid container images from the container repository 120. The storage volume identifier may include a logical unit number (LUN) of one or more storage volumes. The controller identifier may indicate the controller on which the container has to be executed on. The resource limit may indicate a maximum amount or value of computing resources that may be utilized at the controller for executing the container.

At 204 of method 200, the controller 104-1 may obtain a container image 122-1 from the container repository 120 based on the container identifier indicated in the container specification 124-1. For example, the controller 104-1 may download the container image 122-1 from the container repository 120 over the network 118. In some examples, the controller 104-1 may send a request indicating the container identifier (e.g., UUID of the container image) to the container repository 120. The controller 104-1 may obtain the container image 122-1 corresponding to the container identifier from the container repository 120. In some examples, the controller 104-1 may authenticate the container image 122-1 using a license key, which may be indicated in the container specification. The container image 122-1 may be stored in the memory resource 112-1 of the controller 104-1, for example.

At 206 of method 200, the controller 104-1 may select a storage volume from storage volumes 126-1 to 126-P based on the storage volume identifier specified in the container specification 124-1. In some examples, the storage volume identifier may indicate a controller identifier that identifies a host bus adapter, a disk identifier that identifies specific LUNs, a slice identifier that identifies a specific partition on disk, or the like. The controller 104-1 may use such identifiers specified in the storage volume identifier and assign a storage volume (e.g., storage volume 126-1) corresponding to the identifiers to the container image 122-1. For example, assigning a storage volume to a container image may include recording a mapping between the storage volume and the container image in a database (e.g., in a persistent repository 340 of FIG. 3). The database may include a table with plurality of rows and columns including key-value pairs, where the key may include identifiers of container images and the corresponding values may include identifiers of storage volume assigned to those container images. In some examples, the controller 104-1 may use a mapping between storage volume(s) and a container image to control (e.g., authorize) container(s) executed from the container image to access and perform operations (e.g., read/write operations) on the corresponding storage volume(s).

At 208 of method 200, the controller 104-1 may select a controller from the controllers 104-1, 104-2 based on the controller identifier. In some examples, the controller identifier may indicate an identity of a controller or a component of the controller. For example, the controller identifier may indicate a host port (e.g., in the network interface 117-1) of a controller (e.g., of controller 104-1). Based on the indicated host port, the controller 104-1 may select the controller (e.g., controller 104-1) that includes the indicated host port for executing the container 122-1A.

At 210, the controller 104-1 may authorize a container executed from one of the container images to access one or more storage volume(s). For example, the controller 104-1 may, based on the mapping of identifiers of a container image and storage volume(s) stored in the persistent repository, allow a container from the container image to access the storage volume(s). In the example of FIG. 1, the controller 104-1 may allow the container 122-1A, when executed by a processing resource, to access the storage volume 126-1.

In some examples, the controller 104-1 may determine whether resource availability at the selected controller is greater than the resource limit. The resource availability may indicate the level of computing resources available (i.e., not utilized) at a controller. The resource availability and resource utilization at a controller may be expressed in terms of percentage of computing resources, such as processing resources, memory resources, network resources, or the like, or a combination thereof, that are ready to be utilized. For example, at a controller, if the utilization of processing resources is 60% and the utilization of memory resources is 80%, then the resource availability of the processing resources may be 40% and the resource availability of the memory resources may be 30%. The resource availability of the controller 104-1 may be compared with a resource limit that indicates a maximum amount of computing resources that a container executing at the controller may utilize.

At 212 of method 200, the controller 104-1 may determine whether the computing resource availability at the selected controller is greater than the resource limit (i.e., that the amount of computing resources available at the controller is greater than the maximum amount that the container is allowed to utilize). For example, the resource limit for the container may indicate that the maximum amount of processing resources 108-1 that the container is allowed to consume is 30% and that the maximum amount of memory resources 112-1 that the container is allowed to consume is 20%. If the resource availability at the processing resources 108-1 is 40% and the resource availability at the memory resources 112-1 is 30%, then the controller 104-1 may determine that the resource availability at the controller 104-1 is greater than the resource limit.

In response to the determination, the controller 104-1 may initiate execution of the container on the processing resources 108-1 of the controller 104-1. For example, the processing resources 108-1 may run the container 122-1A, which accesses the storage volume 126-1 (as shown by the dotted arrow 160) and performs operations against the storage volume 126-1. In various examples, the operation on the storage volumes may include a read operation, write operation, compression operation, deduplication operation, snapshot operation, or the like. In some examples, the containers may directly access the storage volumes from user space using local access methods, such as standard Portable Operating System Interface (POSIX), Asynchronous Input Output (AIO) interfaces, Internet Small Computer Systems Interface (iSCSI) loopback, vhost protocols (e.g., vhost SCSI). In some examples, the container specification 124-1 may specify a target client identity. The target client identity may indicate an identity of a client device (e.g., target client 128) such as a server, user device, or the like, where a result of the execution of the container 122-1A may be transmitted. The controller 104-1 may send the result of the operation to the target client 128.

In other examples, the controller 104-1 may determine that the resource availability at the selected controller is not greater than the resource limit (i.e., the maximum amount of computing resources that the container may be allowed to consume at the controller exceeds the amount of computing resources available at the controller). For example, the resource limit may indicate that the maximum value of utilization of processing resources 108-1 is 30% and memory resources 112-1 is 20% but the actual resource availability of the processing resources 108-1 is 25% and the resource availability of memory resources 112-1 is 15%. In such examples, the controller 104-1 may determine that the resource availability at the controller 104-1 is less than the resource limit (i.e., the computing resources are insufficient). In response to the determination, the controller 104-1 may not execute the container 122-1A. In some examples, the controller 104-1 may select another controller that has a resource availability greater than the resource limit. For example, the controller 104-1 may determine that second controller 104-2 has a resource availability greater than the resource limit. In such examples, the controller 104-1 may move the container 122-1A from the memory resources 112-1 of the first controller 104-1 to the memory resources 112-2 of the second controller 104-2 (as shown by the dotted arrow 170). The controller 104-1 may also allow the container 122-1A to access the storage volume 126-1 when executed by the processing resources 108-2 of the second controller 104-2 (as shown by the dotted arrow 161). The processing resources 108-2 may execute the container 122-1A on the second controller 104-2 to perform the operation on the storage volume 126-1. Although in the examples illustrated herein, resource availability and resource limits are described with respect to memory and processing resource measurements, it will be appreciated that other metrics (e.g., network bandwidth, throughput, or the like) associated with the controllers may be used for determination of service location (i.e., which controller to utilize).

Figure 3:
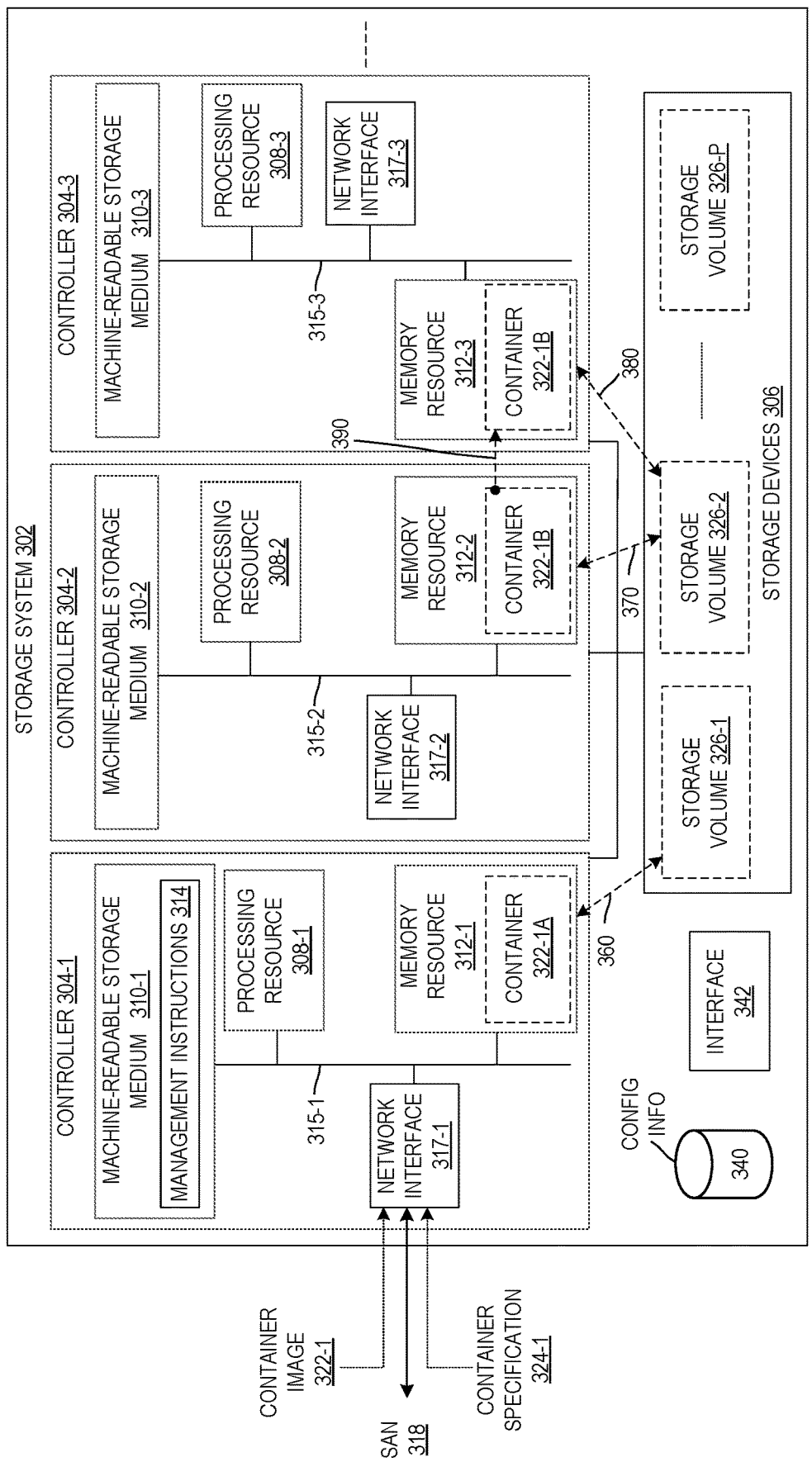
FIG. 3 is a block diagram of a storage system that performs management of containers, in accordance with another example.
Figure 4:
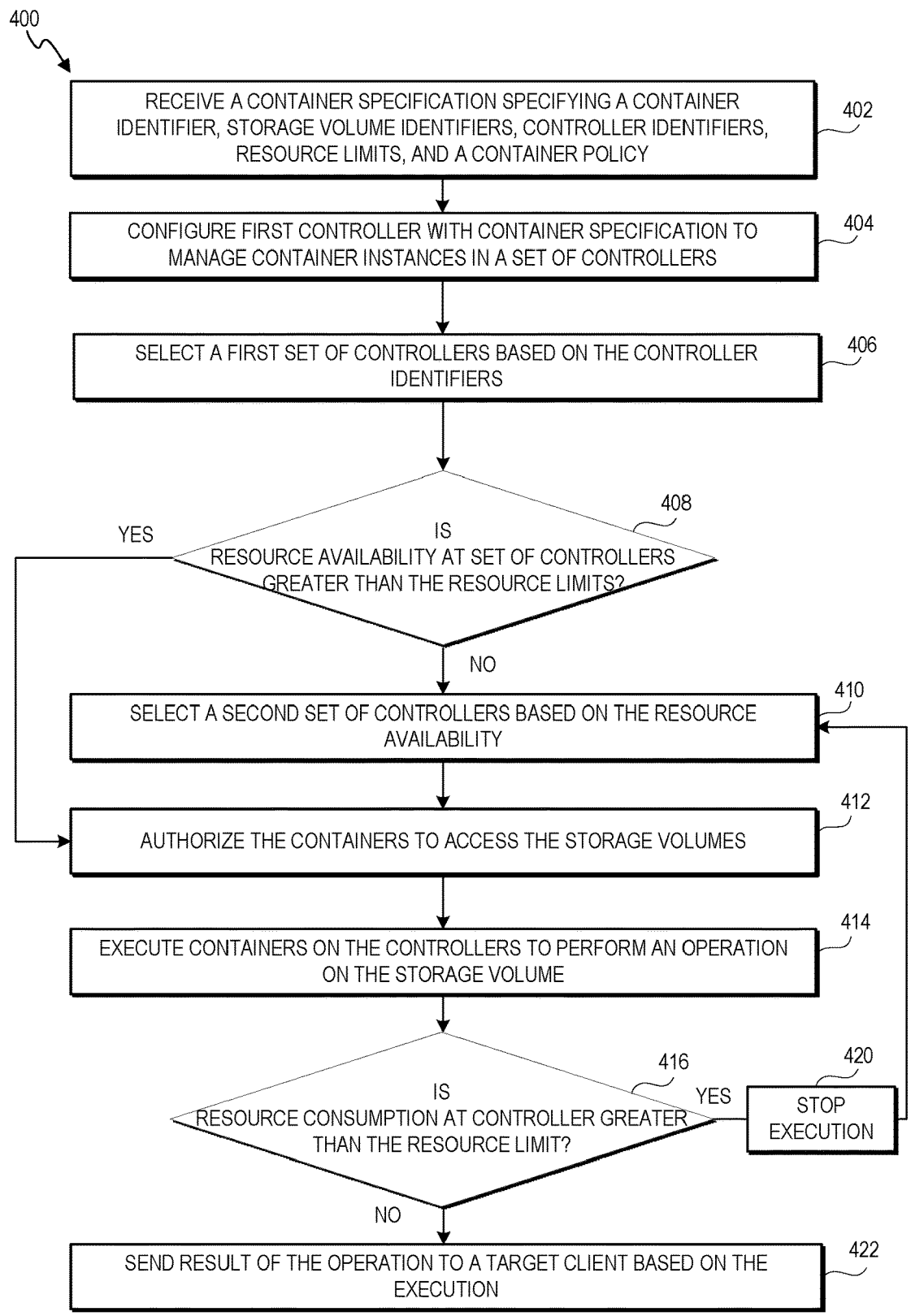
FIG. 4 is a flowchart of a method to manage containers in a storage system within resource limits, in accordance with an example.

FIG. 3 depicts a storage system 302 that performs management of containers, in accordance with another example of the present subject matter. Examples are described below in relation to FIGS. 3 and 4. FIG. 4 is a flowchart of an example method 400 to manage containers in the storage system 302, where the method includes executing one or more container(s) in the storage system 302 within resource limits. Although, the execution of the method 400 is described below with reference to storage system 302 of FIG. 3, other systems suitable for the execution of these methods may be utilized (e.g., storage system 102 of FIG. 1, or storage system 502 of FIG. 5, or the like). Additionally, implementation of this method is not limited to such examples. Although the flowchart of FIG. 4 shows a specific order of performance of certain functionalities, the method is not limited to that order. For example, the functionalities shown in succession in the flowchart may be performed in a different order, may be executed concurrently or with partial concurrence, or a combination thereof.

The storage system 302 may include a controller 304-1 (referred to herein as "a first controller"), a controller 304-2 (referred to herein as "a second controller"), and a controller 304-3 (referred to herein as "a third controller"). Each controller 304-1, 304-2, 304-3 may include a respective processing resource 308-1, 308-2, 308-3, a respective machine-readable storage medium 310-1, 310-2, 310-3, and a respective memory resource 312-1, 312-2, 312-3. Although for clarity, a relatively small number of controllers, processing resources, machine-readable media, memory resources are illustrated in the storage system 302 shown in FIG. 3, the storage system in the examples described herein may include more or fewer controllers, processing resources, machine-readable media, and memory resources.

In the example of FIG. 3, the first controller 304-1 may be configured as the management controller. For example, the machine-readable storage medium 310-1 of the first controller 304-1 may store at least management instructions 314 that are executable by the processing resource 308-1 to manage containers in the storage system 302. In some examples, the first controller 304-1 may be configured to manage containers using the at least management instructions 314 while controllers 304-2, 304-3 may not be enabled to manage containers. In other examples, one or more of the controllers 304-1, 304-2, 304-3 may be configured as management controllers for managing containers in the storage system 302. The components of the controllers 304-1, 304-2, 304-3 may communicate over one or more busses 315-1, 315-2, 315-3, respectively. Each controller 304-1, 304-2, 304-3 may include respective network interfaces 317-1, 317-2, 317-3, which may be network interface cards (NICs), FC host-bus adapters (HBAs), or the like, to communicate over one or more computer networks. In the example of FIG. 3, the storage system 302 may be connected to a SAN 318 or any other network, such as a network 118 described in relation to FIG. 1.

In the example of FIG. 3, the storage system 302 may also include a persistent repository 340, which may be implemented by any suitable type of non-volatile storage (e.g., a solid-state storage (SSD) device(s), such as flash device(s), or a hard disk drive(s) (HDDs), or the like). The storage system 302 may further include an interface 342. The interface 342 may be a user interface, such as a Graphical User Interface (GUI) of the storage system 302. The GUI may allow a user to "log-in" to the storage system 302 and may be associated with an input device such as a touch-screen, keyboard, mouse, etc., for example. The interface 342 may be implemented by any combination of hardware and programming. The storage system 302 may include storage devices 306, which may be analogous to the storage devices 106 described in relation to FIG. 1.

Referring to examples of FIGS. 3 and 4, the storage system 302 may manage multiple containers from the container image 322-1. The processing resource 308-1 of the first controller 304-1 may execute the management instructions 314 stored in the machine-readable medium 310-1 to perform the method 400. At 402 of method 400, the first controller 304-1 may receive a container specification 324-1 associated with the container image 322-1 from a host device (e.g., the host device 116-1 of FIG. 1) executing a host application. The container specification 324-1 may include configuration information for managing a container 322-1A in the storage system 302. In some examples, the configuration information of each container image may be stored in the persistent repository 340 of the storage system 302. In some examples, the configuration information stored in the persistent repository 340 may be modified manually (e.g., by a storage administrator) via the interface 342. In various examples, the configuration information may include a container identifier, storage volume identifiers, controller identifiers, and resource limits as described in relation to FIG. 1. The configuration information may also include a container policy for the execution of one or more containers from the container image 322-1 at the storage system 302. The container policy may include a set of rules governing the execution of a container. In some examples, the container policy may indicate a number of containers to be executed in the storage system 302.

At 404 of method 400, the first controller 304-1 may be configured with the container specification 324-1 to manage the containers. For example, the first controller 304-1 may obtain the container image 322-1 from the container repository using the container identifier specified in the container specification 324-1. The first controller 304-1 may select storage volumes based on the storage volume identifiers specified in the container specification 324-1. In some examples, the storage volume identifiers may include a disk identifier that identifies specific LUNs, a slice identifier that identifies a specific partition on a disk, or the like. In some examples, the first controller 304-1 may select multiple storage volumes based on the number of containers to be executed as indicated in the container policy. For example, the container policy may indicate two containers of a container image to be executed for performing two different operations. For each container, the first controller may select a different storage volume. The first controller 304-1 may use the information specified in the storage volume identifiers and assign storage volumes (e.g., storage volume 326-1, 326-2) corresponding to the identifiers of the container image 322-1. For example, the container policy may indicate that container 322-1A may perform a deduplication operation on a storage volume 326-1 and container 322-1B may perform a snapshot operation on a different storage volume 326-2. In some examples, assigning a storage volume to a container image may include recording a mapping between the storage volume and the container image in a database (e.g., in the persistent repository 340). The database may include a table with plurality of rows and columns including key-value pairs, where the key may include identifiers of container images and the value may include identifiers of storage volume assigned to that container image.

At 406 of method 400, the first controller 304-1 may select a first set of controllers based on the controller identifiers specified in the container specification 324-1. For example, the first controller 304-1 may determine that the container specification 324-1 indicates the identity of the controllers 304-1, 304-2 and may select the controllers 304-1, 304-2. At 408 of method 400, the first controller 304-1 may determine whether a resource availability at each of the first set of controllers 304-1, 304-2 is greater than the resource limits specified in the container specification or not. The resource availability may indicate a level of computing resources available (i.e., not utilized) at the controllers 304-1, 304-2. The resource availability and resource utilization at each controller 304-1, 304-2 may be expressed in terms of percentage of computing resources, such as processing resources, memory resources, or the like. For example, at a controller, if the utilization of processing resources is 60% and the utilization of memory resources is 80%, then the resource availability of the processing resources may be 40% and the resource availability of memory resources may be 20%. The resource availability of the controllers 304-1, 304-2 may be compared with the resource limits that indicate a maximum amount of computing resources that containers executing at respective controllers may utilize.

In response to determining that the resource availability at the first set of controllers 304-1 and 304-2 is greater than the resource limits, i.e., the amount of computing resources available at the first set of controllers is greater than the maximum amount that the containers are allowed to utilize ("YES" at 408), the method 400 may proceed to 412. For example, for the containers, the resource limit at each controller of the first set of controllers may indicate that the maximum amount of processing resources that the container is allowed to consume is 30% and that the maximum value of memory resources the container is allowed to consume is 20%. If the resource availability at the processing resources 308-1, 308-2 is 40% and the resource availability at the memory resources 312-1, 312-2 is 30%, then the controller 304-1 may determine that the resource availability at the controller 304-1 is greater than the resource limits. At 412 of method 400, the first controller 304-1 may authorize the containers 322-1A, 322-1B to access the storage volumes 326-1, 326-2 based on assignment between the container images and storage volumes. For example, the first controller may authorize the container 322-1A may access the storage volume 326-1 (as shown by the dotted arrow 360) and the container 322-1B to access the storage volume 326-2 (as shown by the dotted arrow 370).

In response to determining that the resource availability at the first set of controllers 304-1 and 304-2 is not greater than the resource limits ("NO" at 408), the method 400 may proceed to 410. For example, for a container, the resource limit at each controller in the first set of controllers may indicate, for example, that the maximum amount of processing resources that the container is allowed to consume is 30% and that the maximum amount of memory resources that the container is allowed to consume is 20%. If the resource availability of the processing resources 308-2 is 35% and the resource availability of memory resource 312-2 is 15%, then the first controller 304-1 may determine that the resource availability of the memory resources at the controller 304-2 is less than the resource limit (i.e., memory resource is insufficient). At 410, the first controller 304-1 may select a second set of controllers that have resource availability greater than the resource limit. In the example of FIG. 3, the first controller 304-1 may select controllers 304-1, 304-3 as a second set of controllers, where the resource availability at both controllers may be greater than the resource limits.

At 412 of method 400, the first controller 304-1 may authorize the containers to access the storage volumes 326-1, 326-2. For example, the first controller 304-1 may provide the container 322-1A permission to access and perform operations on the storage volume 326-1 from the first controller 104-1 (as shown by the dotted arrow 360) and the container 322-1A to access and perform operations on the storage volume 326-2 from the second controller 104-2 (as shown by the dotted arrow 380). In such examples, the controller 304-1 may transfer the container 322-1B from the memory resources 312-2 of the second controller to the memory resources 312-3 of the third controller 304-3 (as shown by the dotted arrow 390).

At 414 of method 400, the processing resources of the selected set of controllers may execute the containers 322-1A and 322-1B. For example, on the selection of the first set of controllers, the processing resources 308-1 of the first controller 304-1 may execute the first container 322-1A, and the processing resources 308-2 of the second controller 304-2 may execute the second container 322-1B.

At 416 of method 400, the first controller 304-1 may determine whether resource consumption at the set of controllers is greater than the resource limit. The resource consumption may indicate amount of computing resources (processing resources, memory resources, or the like) consumed at the controllers due to the execution of containers. In some examples, the first controller 304-1 may manage the resource consumption of the containers at each controller using control groups. A control group may include multiple containers that have a common resource limit as indicated in the container specification.

In response to determining that the resource consumption is greater than the resource limit, i.e., the amount of computing resources consumed by the containers exceeds the resource limit ("YES" at 416), the first controller 304-1 may stop the execution of the container at the selected set of controllers and proceed to 410 to select another set of controllers. In response to a determination that a resource consumption at the one or more controllers is not greater than the resource limit ("NO" at 416), the method 400 may proceed to 422. At 422, the first controller 304-1 may send a result of the operation to a target client, which may be indicated in the container specification 324-1, after the execution of the container.

Figure 5:
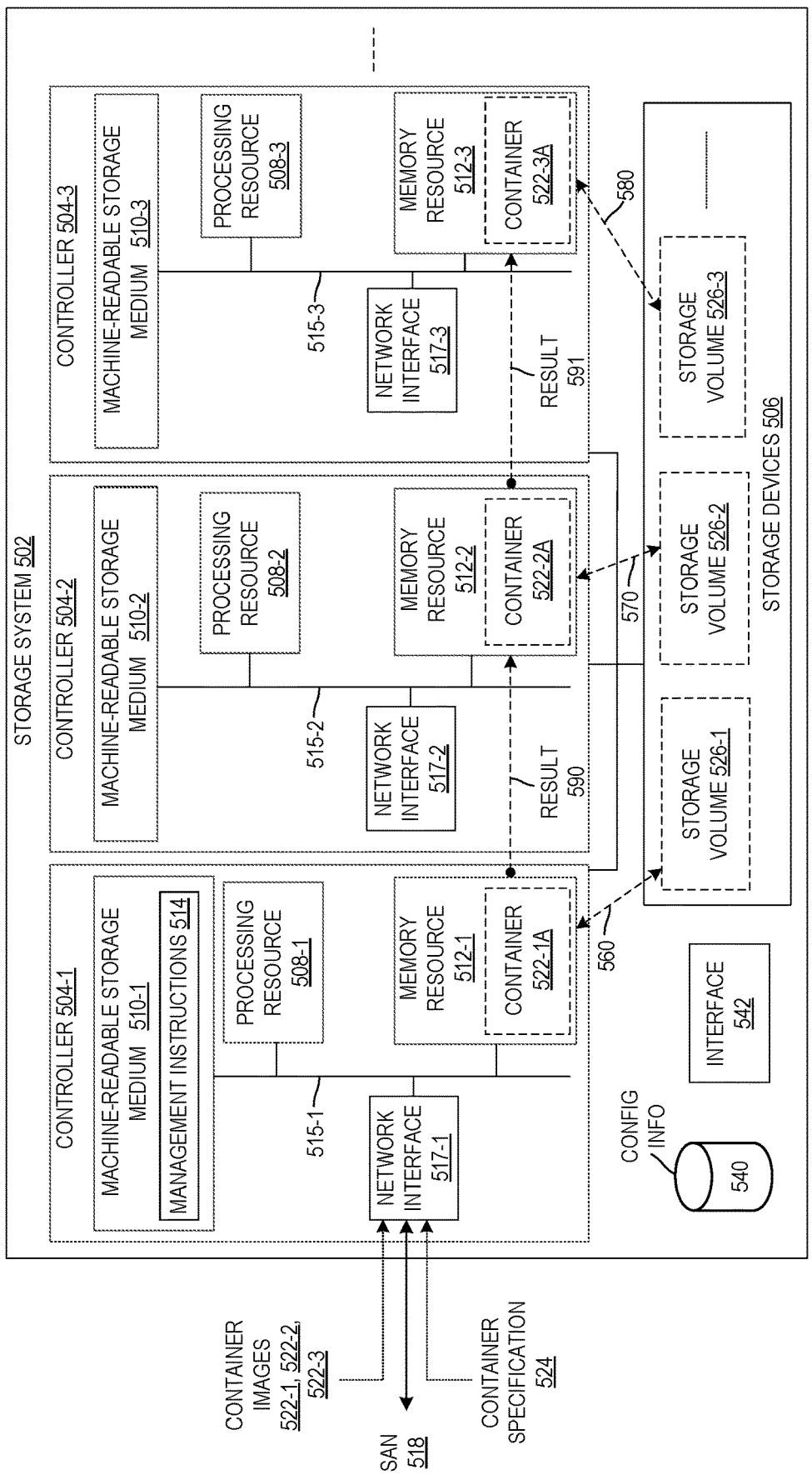
FIG. 5 is a block diagram of a storage system that performs management of multiple containers, in accordance with an example.
Figure 6:
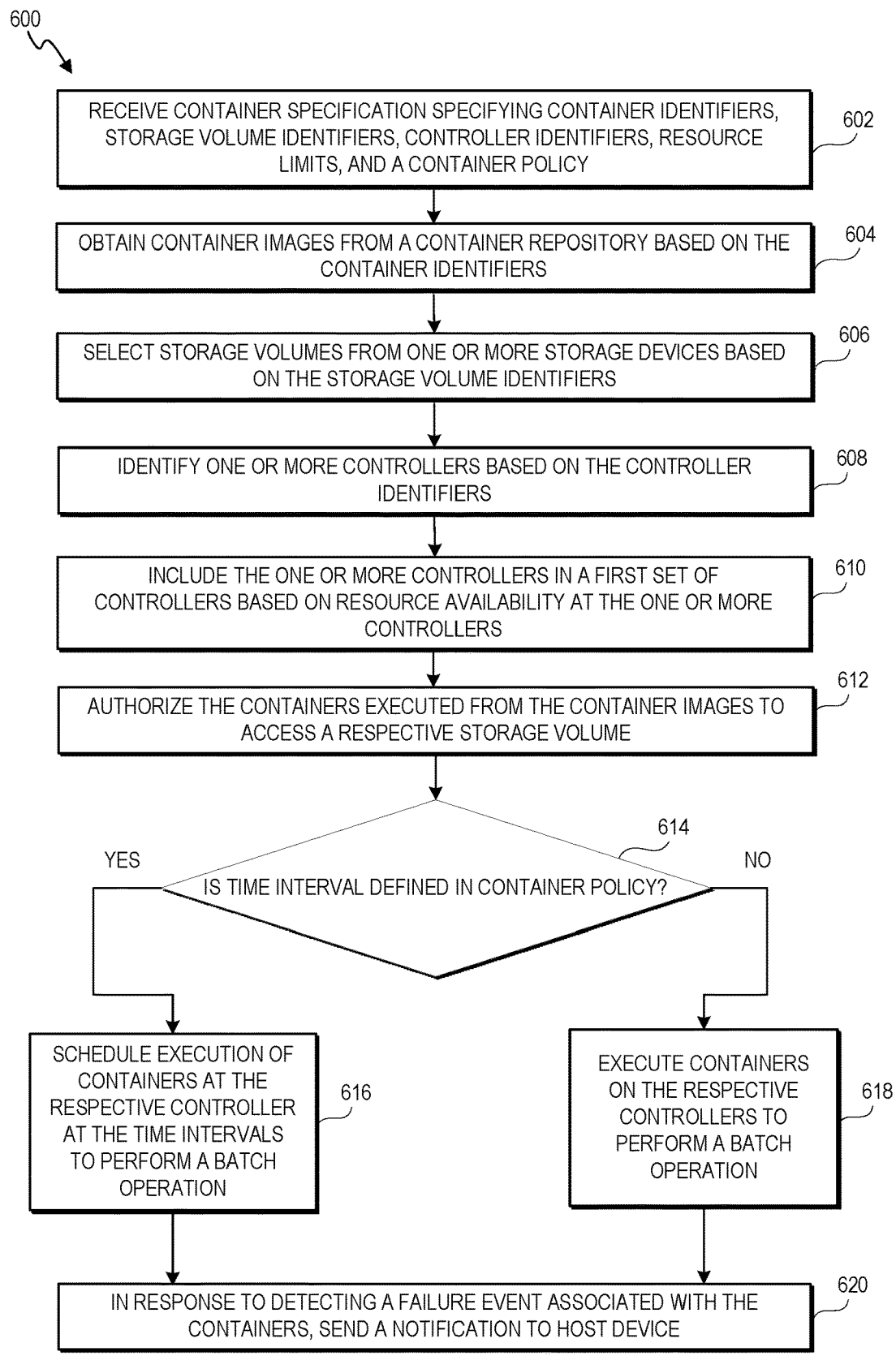
FIG. 6 is a flowchart of a method to manage multiple containers in a storage system, in accordance with an example.

Examples are described below in relation to FIGS. 5 and 6. FIG. 5 depicts a storage system 502 that performs management of multiple containers, in accordance with an example of the present subject matter. FIG. 6 is a flowchart of an example method 600 to manage multiple containers in the storage system 502, where the method 600 includes executing containers in the storage system 502 to perform a batch operation within resource limits. Although the execution of method 600 is described below with reference to storage system 502 of FIG. 5, other systems suitable for the execution of these methods may be utilized (e.g., storage system 102 of FIG. 1, or storage system 302 of FIG. 3, or the like). Additionally, implementation of this method is not limited to such examples. Although the flowchart of FIG. 6 shows a specific order of performance of certain functionalities, the method is not limited to that order. For example, the functionalities shown in succession in the flowchart may be performed in a different order, may be executed concurrently or with partial concurrence, or a combination thereof.

The storage system 502 may include controllers 504-1, 504-2, and 504-3, each including a respective processing resource 508-1, 508-2, 508-3, a respective machine-readable storage medium 510-1, 510-2, 510-3, and a respective memory resource 512-1, 512-2, 512-3. The controllers 504-1, 504-2, 504-3 and their components may be analogous to the controllers 304-1, 304-2, 304-3. Although, for clarity, a relatively small number of controllers, machines-readable media, memory resources are illustrated in the storage system 502 shown in FIG. 5, the storage systems in the examples described herein may include more or fewer controllers, machine-readable media, and memory resources.

In the example illustrated in FIG. 5, the first controller 504-1 may include a machine-readable storage medium 510-1 storing at least management instructions 514 that are executable by the processing resource 508-1 to manage containers in the storage system. In some examples, the first controller 504-1 may be configured as the management controller and enabled to manage multiple containers using at least management instructions 514 while controllers 504-2, 504-3 may not be enabled to manage the multiple containers. In other examples, one or more of the controllers 504-1, 504-2, 504-3 may be configured as management controllers for managing the multiple containers in the storage system 502. The components of the controllers 504-1, 504-2, 504-3 may communicate over one or more busses 515-1, 515-2, 515-3, respectively. Each controller 504-1, 504-2, 504-3 may include network interfaces 517-1, 517-2, 517-3 which may be respective network interface cards (NICs), FC host-bus adapters (HBAs), or the like, to communicate over one or more computer networks. In the example of FIG. 5, the storage system 502 may be connected to a SAN 518 or any other network, such as a network 118 described in relation to FIG. 1. The storage system 502 may also include a persistent repository 540 and an interface 542, which may be analogous to the persistent repository 340 and the interface 342 of FIG. 3. The storage system 502 may include storage devices 506, which may be analogous to the storage devices 106 depicted in FIG. 1.

Referring to examples of FIGS. 5 and 6, the storage system 502 may manage containers corresponding to multiple container images 522-1, 522-2, 522-3 to perform batch operations. The processing resource 508-1 of the first controller 504-1 may execute the management instructions 514 stored in the machine-readable medium 510-1 to perform the method 600. At 602 of method 600, the first controller 504-1 may receive container specification 524 from a host device (e.g., host device 116-1 of FIG. 1) executing a host application. In the example of FIG. 5, the container specification 524 may include a request to move data stored in the storage system 502 to another storage system (not shown in FIG. 5). The container specification 524 may be associated with the containers 522-1, 522-2, 522-3, for example. Each container may be executed to perform one or more operations for moving data stored in one storage system to another. For example, container 522-1 may perform a deduplication operation, container 522-2 may perform a snapshot operation, and container 522-3 may perform a transfer operation. In the example of FIG. 5, the container specification 524 may specify container identifiers, storage volume identifiers, controller identifiers, resource limits, and a container policy for the execution of the containers 522-1A, 522-2A, 522-3A at the storage system 502.

At 604 of method 600, the first controller 504-1 may obtain the container images 522-1, 522-2, 522-3 from the container repository (e.g., container repository 120 of FIG. 1) based on the container identifiers specified in the container specification 524. At 606 of method 600, the first controller 504-1 may select storage volumes 526-1, 526-2, 526-3 from one or more storage devices using the storage volume identifiers specified in the container specification 524.

At 608 of method 600, the first controller 504-1 may identify the controllers based on the controller identifiers. At 610 of method 600, the first controller 504-1 may include one or more of the identified controllers in a first set of controllers based on the resource availability associated with the each of the one or more controllers. For example, the first controller 504-1 may identify controllers 504-1, 504-2, 504-3 based on the controller identifiers indicated in the container specification 524. The first controller 504-1 may determine whether the resource availability of the selected controllers 504-1, 504-2, 504-3 is greater than the resource limits indicated in the container specification 524. The resource availability may indicate the level of computing resources available (i.e., not utilized) at the controllers 504-1, 504-2, 504-3. The controller 504-1 may compare the resource availability of the controllers 504-1, 504-2, 504-3 with the resource limits, which indicates a maximum amount of computing resources that a container executing at the controller may utilize.

At 612 of method 600, the controller 504-1 may authorize the containers to access the storage volumes when executed on the respective controllers of the first set of controllers. For example, the first controller 504-1 may authorize the container 522-1A to access the storage volume 526-1, the container 522-2A to access the storage volume 526-2, and the container 522-3A to access the storage volume 526-3.

At 614 of method 600, the first controller 504-1 may determine whether a time interval is defined in the container policy or not. In response to determining that a time interval is defined in the container policy ("YES" at 614), the method 600 proceeds to 616. At 616, the first controller 504-1 may schedule execution of the containers 522-1A, 522-2A, 522-3A by the processing resources 508-1, 508-2, 508-3, respectively, at the time interval. In such examples, the processing resources 508-1, 508-2, 508-3 may execute the containers 522-1A, 522-2A, 522-3A, respectively, in a periodic manner. In response to determining that a time interval is not defined in the container policy ("NO" at 614), the method 600 may proceed to 618. At 618, the processing resources 508-1, 508-2, 508-3 may execute the containers 522-1A, 522-2A, 522-3A on the respective controllers. In some examples, the processing resource 508-1 may execute container 522-1A to perform a deduplication operation on storage volume 526-1. The processing resource 508-2 may execute the container 522-2A to perform a snapshot operation on the storage volume 526-2. The processing resource 508-3 may execute the container 522-3A to perform a transfer operation on the storage volume 526-3.

In some examples, the container policy may include batch operation commands for performing multiple operations on one or more storage volumes in a batch. In the example of FIG. 5, the processing resources 508-1, 508-2, 508-3 may execute the containers 522-1A, 522-2A, 522-3A to perform a batch operation. In some examples, the batch operation may include forwarding a result of the execution of one container to another container as an input. Example of such a batch operation may include one or more of a deduplication operation, a snapshot operation, and a transfer operation, each performed by executing a container. For example, the first controller 504-1 may send a result 590 (e.g., deduplicated representation of storage volume 526-1) of the execution of container 522-1A to the memory resource 512-2 of the second controller 504-2. The container 522-2A may use the result 590 as input during its execution and send a result 591 (e.g., snapshot of the deduplicated representation of storage volume 526-1) to the memory resource 512-3. The container 522-3A may use the result 591 as input during its execution to perform a transfer operation (e.g., transferring to a target client).

In other examples, the batch operation may include multiple operations performed separately on different storage volumes. In such examples, the container 522-1A may access the storage volume 526-1 (as shown by the dotted arrow 560), the container 522-2A may access the storage volume 526-2 (as shown by the dotted arrow 570), and the container 522-3A may access the storage volume 526-3 (as shown by the dotted arrow 580). The processing resources 508-1, 508-2, 508-3 may execute the containers 522-1A, 522-2A, 522-3A to perform the operation on the storage volumes 526-1, 526-2, 526-3.

In some examples, the container specification may include a target client. The first controller 504-1 may send a final result of the operations as a batch result to the target client (e.g., target client device 128 of FIG. 1), for example. In some examples, the controller 504-1 may be configured to monitor the containers 522-1A, 522-2A, 522-3A. For example, the controller 504-1 may monitor the status of the container to detect any occurrence of a failure event associated with the containers. In response to the failure event, the first controller 504-1 may perform an action to mitigate the failure event. In the example of FIG. 6, at 620, the controller 504-1 may send a notification or alert indicative of the failure event to a host device. Some examples of a failure event may include an unauthorized download of container images from the container repository, invalid information in container specification (such as invalid container identifiers, storage identifiers, controller identifiers, container policies, or the like), over-consumption of computing resources due to execution of a container, availability of network interfaces, or the like.

Figure 7:
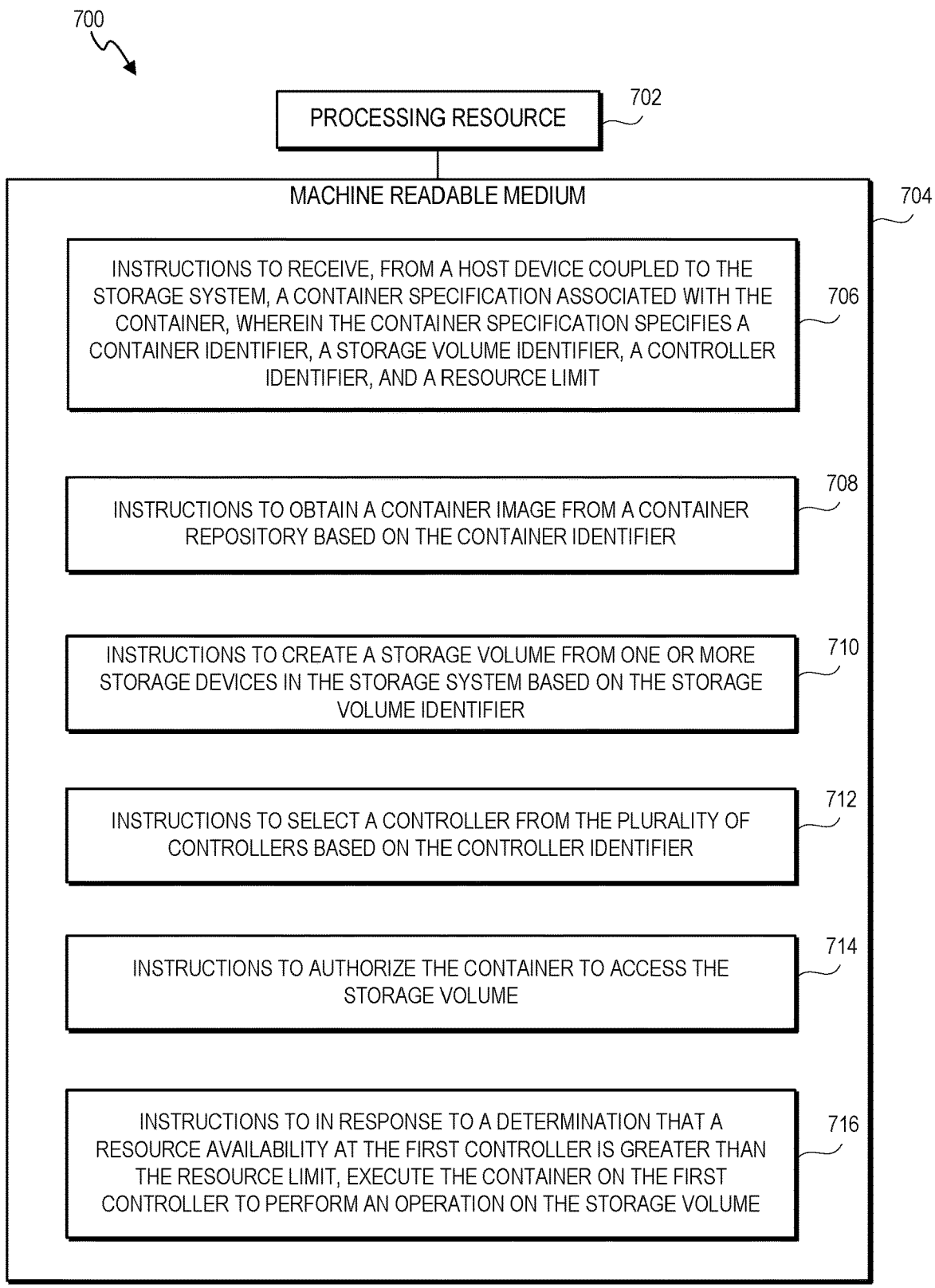
FIG. 7 is a block diagram of a processing resource and a machine-readable medium encoded with example instructions to manage containers in a storage system, in accordance with an example.

Moving to FIG. 7, a block diagram 700 depicting a processing resource 702 and a machine-readable medium 704 encoded with example instructions to facilitate container management in storage systems, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 108-1 of the storage system 102 described in relation to FIG. 1. Further, the machine-readable medium 704 may represent one example of the machine-readable medium 110-1 of the storage system 102 described in relation to FIG. 1.

The machine-readable medium 704 may be any electronic, magnetic, optical, or other physical storage device that may store data and/or executable instructions. As described in detail herein, the machine-readable medium 704 may be encoded with executable instructions 706, 708, 710, 712, 714, and 716 (hereinafter collectively referred to as instructions 706-716) for performing the method 200 described in FIG. 2. Although not shown, in some examples, the machine-readable medium 704 may be encoded with certain additional executable instructions to perform the method 200 of FIG. 2, and/or any other operations performed by the storage system 102, without limiting the scope of the present disclosure.

The processing resource 702 may be a physical device capable of retrieving and executing the instructions 706-718 stored in the machine-readable medium 704, or combinations thereof. In some examples, the processing resource 702 may fetch, decode, and execute the instructions 706-718 stored in the machine-readable medium 704 to manage containers in storage systems. In certain examples, as an alternative or in addition to retrieving and executing the instructions 706-718, the processing resource 702 may include at least one IC, other control logic, other electronic circuits, or combinations thereof that include a number of electronic components for performing the functionalities intended to be performed by the system 102 of FIG. 1, for example.

The instructions 706 when executed by the processing resource 702 may cause the processing resource 702 to instructions to receive a container specification associated with the container from a host device coupled to the storage system. The container specification specifies a container identifier, a storage volume identifier, a controller identifier, and a resource limit. The instructions 708 when executed by the processing resource 702 may cause the processing resource 702 to obtain a container image from a container repository based on the container identifier. The instructions 710 when executed by the processing resource 702 may cause the processing resource 702 to select a storage volume from one or more storage devices in the storage system based on the storage volume identifier. The instructions 712 when executed by the processing resource 702 may cause the processing resource 702 to select a controller from the plurality of controllers based on the controller identifier. The instructions 714 when executed by the processing resource 702 may cause the processing resource 702 to authorize the container to access the storage volume. Further, the instructions 716 when executed by the processing resource 702 may cause the processing resource 702 to execute a container on the first controller to perform an operation on the storage volume in response to a determination that a resource availability at the first controller is greater than the resource limit.

In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing system" may be a server, storage device, storage array, desktop or laptop computer, switch, router, or any other processing device or equipment including a processing resource. In examples described herein, a processing resource may include, for example, one processor or multiple processors included in a single computing system or distributed across multiple computing system. As used herein, a "processor" may be at least one of a central processing unit (CPU), a core, a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing system executing the machine-readable instructions, or remote from but accessible to the computing system (e.g., via a computer network) for execution. In the examples illustrated herein, storage medium 110-1, 110-2 may each be implemented by one machine-readable storage medium, or multiple machine-readable storage media. While storage medium 110-1, 110-2 is illustrated as separate from physical memory 112-1, 112-2, in some embodiments they may be separate, while in other embodiments they may not be separate.

In examples described herein, a storage system or storage array may be a computing system comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual volume made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor-executable instructions stored on at least one non-transitory machine-readable storage medium, and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing system may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract, and drawings), and/or all of the elements of any method or process so disclosed, may be combined in any combination, except combinations where at least some of such features and/or elements are mutually exclusive. For example, functionalities described herein in relation to any of FIGS. 1-7 may be provided in combination with functionalities described herein in relation to any other of FIGS. 1-7.

What is claimed is:

1. An article comprising at least one non-transitory machine-readable storage medium storing instructions executable by a storage system including a plurality of controllers, wherein the instructions are executable to:
   receive, from a host device coupled to the storage system, a container specification, wherein the container specification comprises a configuration file including a container identifier, a storage volume identifier, a controller identifier, and a resource limit;
   obtain a container image from a container repository based on the container identifier;
   select a storage volume, stored on one or more storage devices in the storage system, based on the storage volume identifier;
   select a first controller from the plurality of controllers based on the controller identifier included in the configuration file;
   authorize a container to be executed from the container image to access the storage volume;
   determine whether or not to execute the container from the container image on the first controller, to perform an operation on the storage volume, based on whether or not a resource availability at the first controller is greater than the resource limit; and
   in response to a determination that the resource availability at the first controller is greater than the resource limit and based on the authorization, execute the container from the container image on the first controller to perform the operation on the storage volume.

2. The article of claim 1, wherein the instructions further include instructions to:
   in response to a determination that the resource availability at the first controller is not greater than the resource limit:
      select, based on a resource availability at a second controller, the second controller from the plurality of controllers for executing the container; and
      execute the container from the container image on the second controller to perform the operation on the storage volume.

3. The article of claim 2, wherein the container specification specifies a target client, and wherein the instructions further include instructions to:
   in response to the operation, send a result of the operation to the target client.

4. The article of claim 1, wherein the container specification specifies a container policy, and wherein the container policy specifies a predetermined time interval to perform the operation on the storage volume.

5. The article of claim 4, wherein the instructions further include instructions to:
   schedule an execution of the container from the container image on the first controller at the predetermined time interval, wherein the execution includes performing the operation on the storage volume; and
   in response to the operation, send a result of the operation to a target client.

6. The article of claim 1, wherein the instructions further include instructions to:
   monitor a resource consumption by the container at the first controller; and
   determine whether the resource consumption is greater than the resource limit.

7. The article of claim 6, wherein the instructions further include instructions to:
   in response to a determination that the resource consumption is greater than the resource limit, stop the execution of the container on the first controller.

8. The article of claim 6, wherein the instructions further include instructions to:
   in response to a determination that the resource consumption is greater than the resource limit:
      select one or more controllers for executing the container; and
      execute the container from the container image on the one or more controllers to perform the operation on the storage volume.

9. The article of claim 1, wherein the instructions further include instructions to:
   monitor a container status associated with the container; and
   in response to a detection of a failure event associated with the container based on the container status, send a notification to the host device indicating the failure event.

10. A storage system comprising:
   a plurality of storage devices;
   a plurality of controllers, wherein at least one controller of the plurality of controllers comprises at least one processing resource and at least one non-transitory machine-readable storage medium comprising instructions executable by the at least one processing resource to:
      receive, from a host device coupled to the storage system, a request comprising a container specification, wherein the container specification comprises a configuration file including one or more container identifiers, storage volume identifiers, controller identifiers, a resource limit, and a container policy, and wherein the container policy specifies batch operation commands;
      obtain one or more container images from a container repository based on the one or more container identifiers included in the container specification;
      select storage volumes, stored on the plurality of storage devices, based on the storage volume identifiers included in the configuration file;
      select a first set of controllers from the plurality of controllers based on the controller identifiers included in the configuration file, wherein the selecting of the first set of controllers comprises:

identifying a given controller of the plurality of controllers based on the controller identifiers included in the configuration file, and in response to a determination that a resource availability at the given controller is greater than the resource limit included in the configuration file, include the given controller in the first set of controllers;

authorize one or more containers to be executed from the one or more container images to access one or more of the storage volumes; and based on the batch operation commands in the container policy and the authorization, execute the one or more containers from the one or more container images on respective controllers of the first set of controllers to perform a batch operation.

11. The storage system of claim 10, wherein the container specification specifies a predetermined time interval, and wherein the instructions are executable by the at least one processing resource to:

schedule execution of the one or more containers from the one or more container images on the respective controllers at the predetermined time interval to perform the batch operation.

12. The storage system of claim 10, wherein the batch operation commands included in the container specification comprise a first command to perform data deduplication, and a second command to perform a data transfer, and wherein the execution of the one or more containers from the one or more container images on the respective controllers of the first set of controllers to perform the batch operation comprises executing a first container from a first container image on a first controller of the first set of controllers, and a second container from a second container image on a second controller of the first set of controllers, the first container to perform the data deduplication, and the second container to perform the data transfer.

13. The storage system of claim 10, wherein the instructions are executable by the at least one processing resource to:

in response to a determination that a resource consumption by the one or more containers executed on the first set of controllers is greater than the resource limit:
select a second set of controllers for executing the one or more containers from the one or more container images; and
execute the one or more containers from the one or more container images on respective controllers of the second set of controllers.

14. A method comprising:

receiving, at a management controller from a host device coupled to a storage system comprising a plurality of storage controllers, a container specification comprising a configuration file including a container identifier, a storage volume identifier, a controller identifier, and a resource limit;

obtaining, by the management controller, a container image from a container repository based on the container identifier included in the configuration file;

selecting, by the management controller, a storage volume, stored on one or more storage devices in the storage system, based on the storage volume identifier included in the configuration file;

authorizing, by the management controller, a container to be executed from the container image to access the storage volume;

selecting, by the management controller, a first storage controller from the plurality of storage controllers based on the controller identifier included in the configuration file;

determining, by the management controller, whether or not to execute the container from the container image on the first storage controller, to perform an operation on the storage volume, based on whether or not a resource availability at the first storage controller is greater than the resource limit;

in response to a determination that the resource availability at the first storage controller is greater than the resource limit and based on the authorization, executing the container from the container image on the first storage controller to perform the operation on the storage volume; and in response to a failure event associated with the container, sending, from the management controller, a notification to the host device indicating the failure event.

15. The method of claim 14, comprising:

in response to a determination that the resource availability at the first storage controller is not greater than the resource limit:
selecting, by the management controller, a second storage controller from the plurality of storage controllers for executing the container from the container image; and
executing the container from the container image on the second storage controller to perform the operation on the storage volume.

16. The method of claim 14, wherein the failure event associated with the container comprises:

a detection that a resource consumption of the container on the first storage controller is greater than the resource limit; or a detection that the container image is not authenticated.

17. The method of claim 16, comprising:

in response to the detection that the container image is not authenticated, authenticating the container image using a license key.

* * * * *